(12) United States Patent
Nagira (10) Patent No.: US 7,234,432 B2
(45) Date of Patent: Jun. 26, 2007

(54) CRANKSHAFT FOR V-TYPE SIX-CYLINDER ENGINE

(75) Inventor: Tetsushi Nagira, Aichi (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/497,212

(22) Filed: Jul. 27, 2006

(65) Prior Publication Data

US 2007/0022999 A1    Feb. 1, 2007

(30) Foreign Application Priority Data

Aug. 1, 2005    (JP) .............................. 2005-223086

(51) Int. Cl.
*F16F 15/26*    (2006.01)
(52) U.S. Cl. .................................. 123/192.2
(58) Field of Classification Search ............. 123/192.2, 123/197.4, 192.1
See application file for complete search history.

(56) References Cited

U.S. PATENT DOCUMENTS

| | | | | |
|---|---|---|---|---|
| 4,833,940 A * | 5/1989 | Ito | ............................. | 74/595 |
| 5,481,942 A * | 1/1996 | Baek | ............................. | 74/603 |
| 5,758,551 A * | 6/1998 | Ozeki | ............................. | 74/603 |
| 6,725,974 B2 * | 4/2004 | Sato et al. | .................... | 184/106 |
| 6,868,816 B2 * | 3/2005 | Hiraki et al. | ............. | 123/192.2 |
| 2003/0221653 A1 * | 12/2003 | Brevick et al. | .......... | 123/192.2 |
| 2004/0154575 A1 * | 8/2004 | Hiraki et al. | ............. | 123/192.2 |

FOREIGN PATENT DOCUMENTS

| | | |
|---|---|---|
| JP | 61-119840 | 6/1986 |
| JP | 63-125216 | 8/1988 |
| JP | 2799133 | 9/1998 |
| JP | 2998058 | 1/2000 |

* cited by examiner

*Primary Examiner*—Willis R. Wolfe
*Assistant Examiner*—Jason Benton
(74) *Attorney, Agent, or Firm*—Morgan & Finnegan, L.L.P.

(57) ABSTRACT

A crankshaft for a V-type six-cylinder engine is equipped with first through sixth crankpins, first through fourth crank journals, and first through ninth arms for connecting the crank pins and the crank journals to each other. Of the first through ninth arms, the third arm and the seventh arm respectively have surplus weight portions (inclusive of counterweights) whose centers of gravity are situated respectively in a direction substantially opposite the first crank pin and the sixth crank pin.

4 Claims, 11 Drawing Sheets

CRANKSHAFT FOR V-TYPE SIX-CYLINDER ENGINE

BACKGROUND OF THE INVENTION

1. Field of the Invention

The present invention relates to a crankshaft for a V-type six-cylinder engine.

2. Description of the Related Art

Generally speaking, a crankshaft used in a V-type six-cylinder engine is equipped with six crank pins, four crank journals, and nine arms for connecting the crank pins and the crank journals to each other. Some of these arms are each equipped with a counterweight for reducing the rotational force of inertia generated in each arm and the unbalance couple generated in the crankshaft.

In a conventional crankshaft, the counterweights are situated in a direction completely opposite the crank pins connected to the arms with respect to the central axis of the crankshaft. That is, in the case of an arm to which only one crank pin is connected, the counterweight is situated in a direction completely opposite that crank pin, and in the case of an arm to which two crank pins are connected, the counterweight is situated in a direction completely opposite the midpoint of the two crank pins.

An example of such a crankshaft is disclosed in JP 8-121539 A. According to the publication, the fourth arm and the sixth arm have no counterweights.

Conventional crankshafts have a problem in that the unbalance couple generated therein cannot be reduced to a sufficient degree.

This is due to the construction in which, in all the arms that are each provided with a counterweight, the respective centers of gravity of the counterweights are situated in a direction completely opposite the positions of the crank pins.

SUMMARY OF THE INVENTION

The present invention has been made with a view toward solving the above problem in the prior art. It is therefore an object of the present invention to provide a crankshaft for a V-type six-cylinder engine, which is capable of reducing the generated unbalance couple to a sufficient degree.

In order to solve the above-mentioned problem, a crankshaft for a V-type six-cylinder engine related to the present invention comprises:

first through fourth crank journals arranged in the stated order from a front end to a rear end, the crankshaft being supported by an external support member by means of the first through fourth crank journals, the first through fourth crank journals being arranged coaxially, and central axes of the first through fourth crank journals constituting a central axis of the crankshaft;

first through sixth crank pins which may be respectively connected to external connecting rods, the first crank pin and the second crank pin being arranged between the first crank journal and the second crank journal, the third crank pin and the fourth crank pin being arranged between the second crank journal and the third crank journal, and the fifth crank pin and the sixth crank pin being arranged between the third crank journal and the fourth crank journal, in the stated order from the front to the rear end; and first through ninth arms connecting the first through fourth crank journals and the first through sixth crank pins to each other, the first through ninth arms being provided in the stated order from the front to the rear end between the first through fourth crank journals and the first through sixth crank pins, wherein the first, second, eighth, and ninth arms respectively have counterweights, the fourth and sixth arms have no counterweights, wherein the third arm has a counterweight, wherein, as seen in the axial direction of the crankshaft, assuming that a straight line passing a point obtained through projection of the central axis of the first crank pin and a point obtained through projection of the central axis of the crankshaft is a central straight line for the third arm, that a straight line passing a point obtained through projection of the central axis of the second crank pin and a point obtained through projection of the central axis of the crankshaft is a first straight line for the third arm, and that a straight line symmetrical with the first straight line for the third arm with respect to the central straight line for the third arm is a second straight line for the third arm, a point obtained through projection of the center of gravity of a surplus weight portion including the counterweight of the third arm is situated on the opposite side of the point obtained through projection of the central axis of the first crank pin with respect to the first straight line for the third arm, and is situated on the opposite side of the point obtained through projection of the central axis of the first crank pin with respect to the second straight line for the third arm, wherein the seventh arm has a counterweight, and wherein, as seen in the axial direction of the crankshaft, assuming that a straight line passing a point obtained through projection of the central axis of the sixth crank pin and a point obtained through projection of the central axis of the crankshaft is a central straight line for the seventh arm, that a straight line passing a point obtained through projection of the central axis of the fifth crank pin and a point obtained through projection of the central axis of the crankshaft is a first straight line for the seventh arm, and that a straight line symmetrical with the first straight line for the seventh arm with respect to the central straight line for the seventh arm is a second straight line for the seventh arm, a point obtained through projection of the center of gravity of a surplus weight portion including the counterweight of the seventh arm is situated on the opposite side of the point obtained through projection of the central axis of the sixth crank pin with respect to the first straight line for the seventh arm, and is situated on the opposite side of the point obtained through projection of the central axis of the sixth crank pin with respect to the second straight line for the seventh arm.

DESCRIPTION OF THE PREFERRED EMBODIMENTS

In the following, embodiments of the present invention will be described with reference to the drawings.

Embodiment 1

Figure 1:
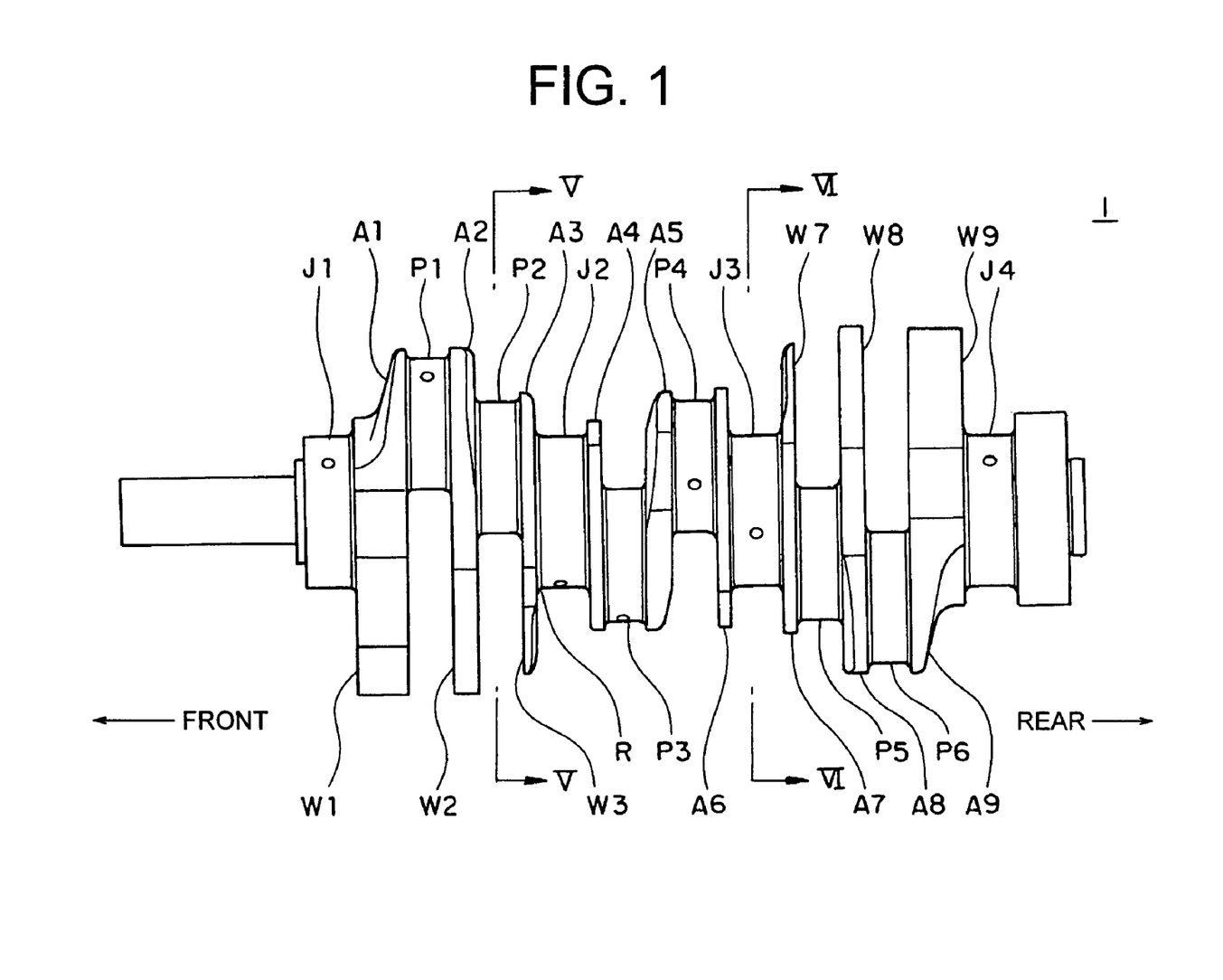
FIG. 1 is a right-hand side view of a crankshaft 1 according to Embodiment 1 of the present invention.
Figure 2:
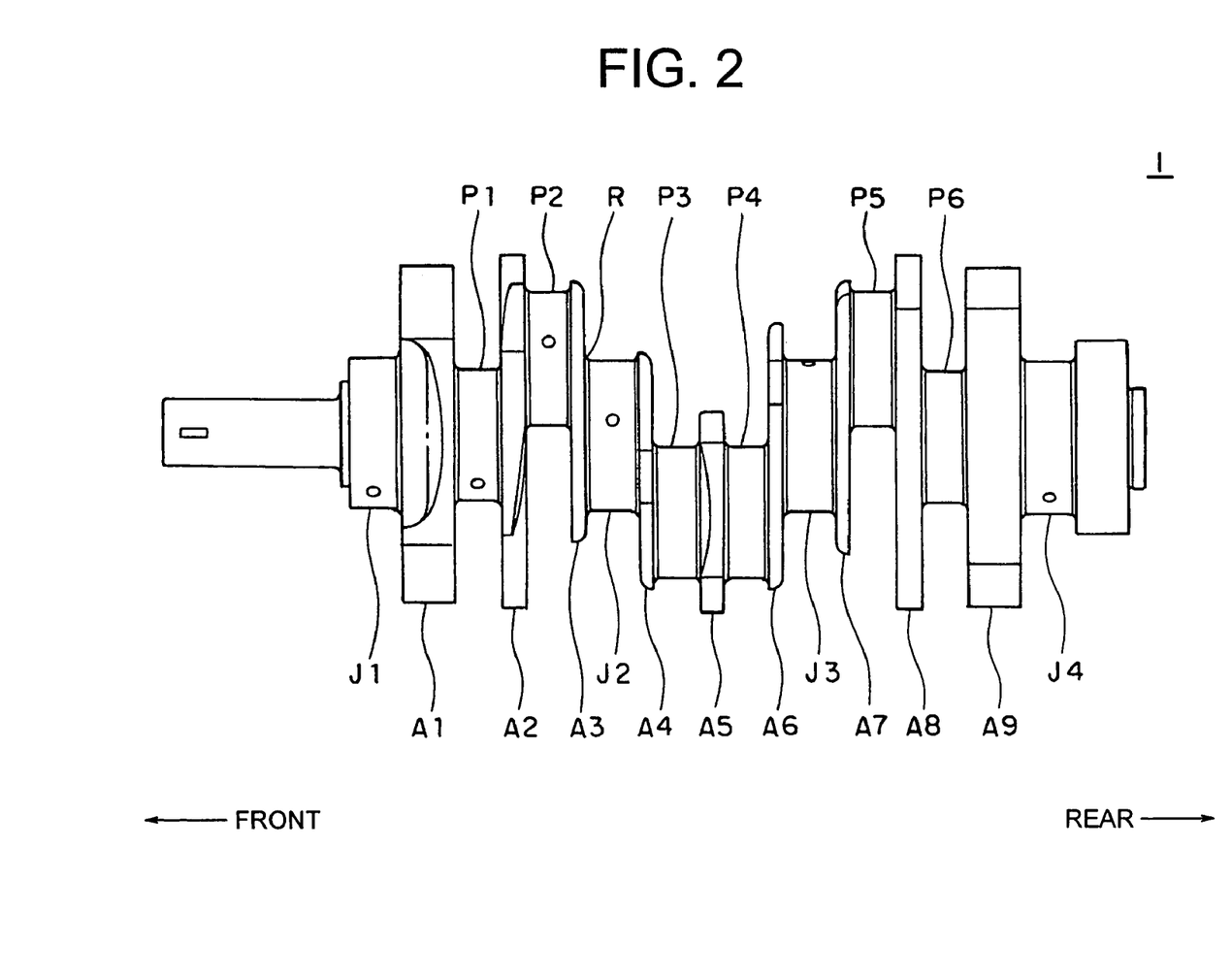
FIG. 2 is a plan view of the crankshaft 1 of Embodiment 1 of the present invention.
Figure 3:
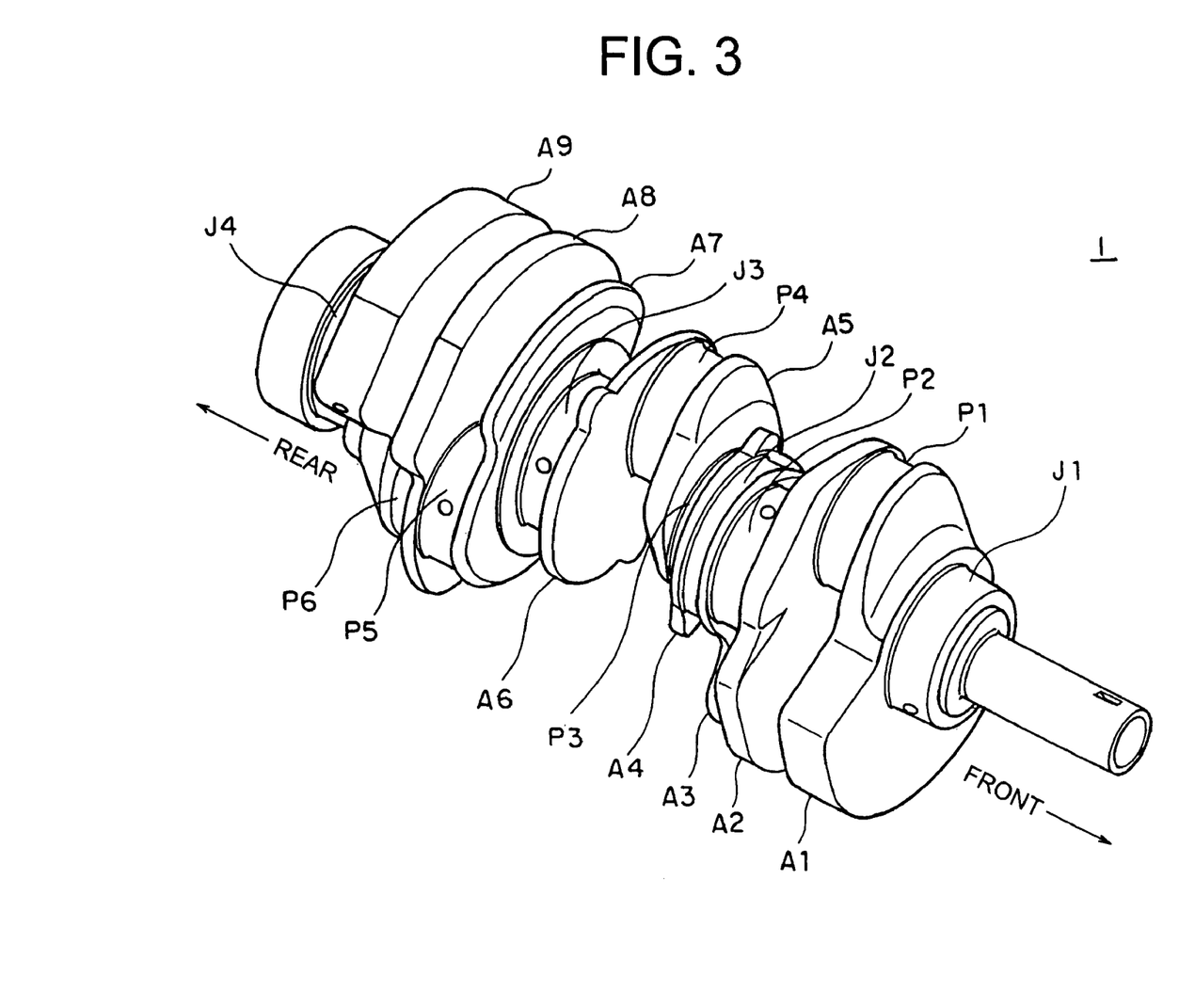
FIG. 3 is a perspective view of the crankshaft 1 of Embodiment 1 of the present invention.

FIGS. 1 through 3 show a crankshaft 1 according to Embodiment 1 of the present invention. FIGS. 1 through 3 are a right-hand side view, a plan view, and a perspective view, respectively, of the crankshaft 1.

The crankshaft 1 is for use in a V-type six-cylinder diesel engine with a 60° bank angle, and includes four crank journals (first through fourth crank journals) J1 through J4, six crank pins (first through sixth crank pins) P1 through P6, and nine arms (first through ninth arms) A1 through A9.

The crank journals J1 through J4 have a substantially cylindrical configuration, each including a cylindrical portion inclusive of a portion near an axial center thereof and radiused portions R formed on both end portions thereof so as to be in contact with the arms A1 through A9 for the purpose of avoiding stress concentration. The crank journals J1 through J4, arranged in the stated order and spaced apart from each other, are arranged coaxially. Central axes of the crank journals J1 through J4 constitute the central axis of the crankshaft 1.

Here, as seen in an axial direction, the crank journal J1 side will be referred to as a front side, and the crank journal J4 side will be referred to as a rear side. The crank journals J1 through J4 are supported by a cylinder block (not shown) through the intermediation of journal bearings (not shown), whereby the crankshaft 1 is rotatably supported by the cylinder block, which serves as a support member.

Between the crank journals J1 through J4, the crank pins P1 through P6, to which connecting rod big ends (not shown) are to be mounted, are arranged in the stated order from the front to the rear end. The crank pins P1 and P2 are situated between the crank journals J1 and J2, the crank pins P3 and P4 are situated between the crank journals J2 and J3, and the crank pins P5 and P6 are situated between the crank journals J3 and J4. The crank pins P1 through P6 have a substantially cylindrical configuration, and have at their respective ends radiused portions like the crank journals J1 through J4.

Figure 4:
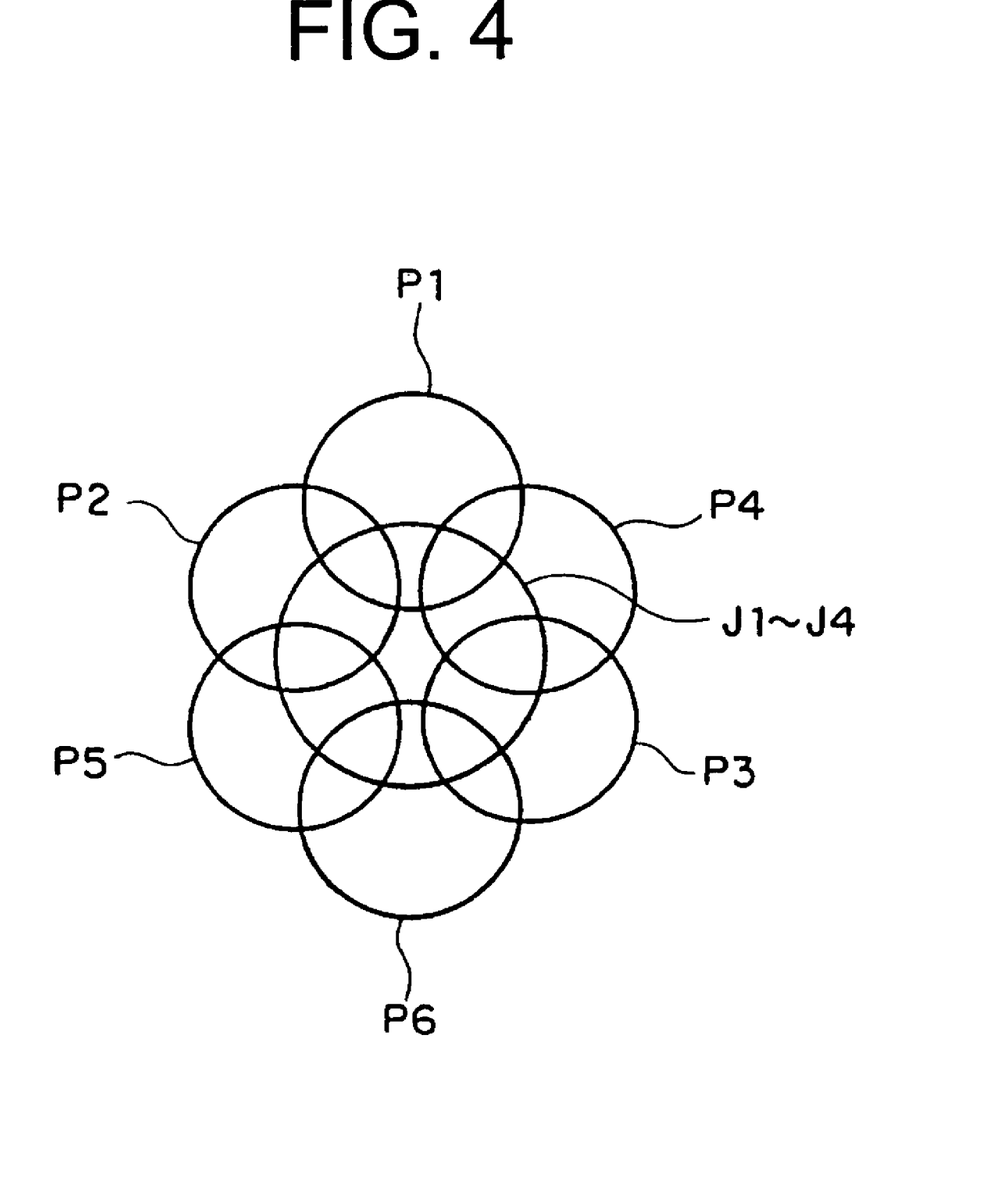
FIG. 4 is a schematic view of a positional relationship between crank journals J1 through J4 and crank pins P1 through P6 as seen from the front side of the crankshaft 1.

FIG. 4 shows a positional relationship between the crank journals J1 through J4 and the crank pins P1 through P6 as seen from the front side in the axial direction of the crankshaft 1. The crank pins are offset from adjacent crank pins by 60 degrees, and are arranged circumferentially in the following order: P1, P2, P5, P6, P3, and P4.

Between the crank journals and the crank pins, there are arranged the arms A1 through A9 connecting the crank journals and the crank pins to each other, in the stated order from the front to the rear side. That is, the crank journals, crank pins, and the arms are arranged in the following order from the front to the rear end: the crank journal J1, the arm A1, the crank pin P1, the arm A2, the crank pin P2, the arm A3, the crank journal J2, the arm A4, the crank pin P3, the arm A5, the crank pin P4, the arm A6, the crank journal J3, the arm A7, the crank pin P5, the arm A8, the crank pin P6, the arm A9, and the crank journal J4.

Of the arms, the arms A1 through A3 and the arms A7 through A9 have counterweights W1 through W3 and counterweights W7 through W9, respectively, for reducing the rotational force of inertia generated in the arms and the unbalance couple generated in the crankshaft 1. The remaining arms, that is, the arms A4 through A6, have no counterweights.

Figure 5:
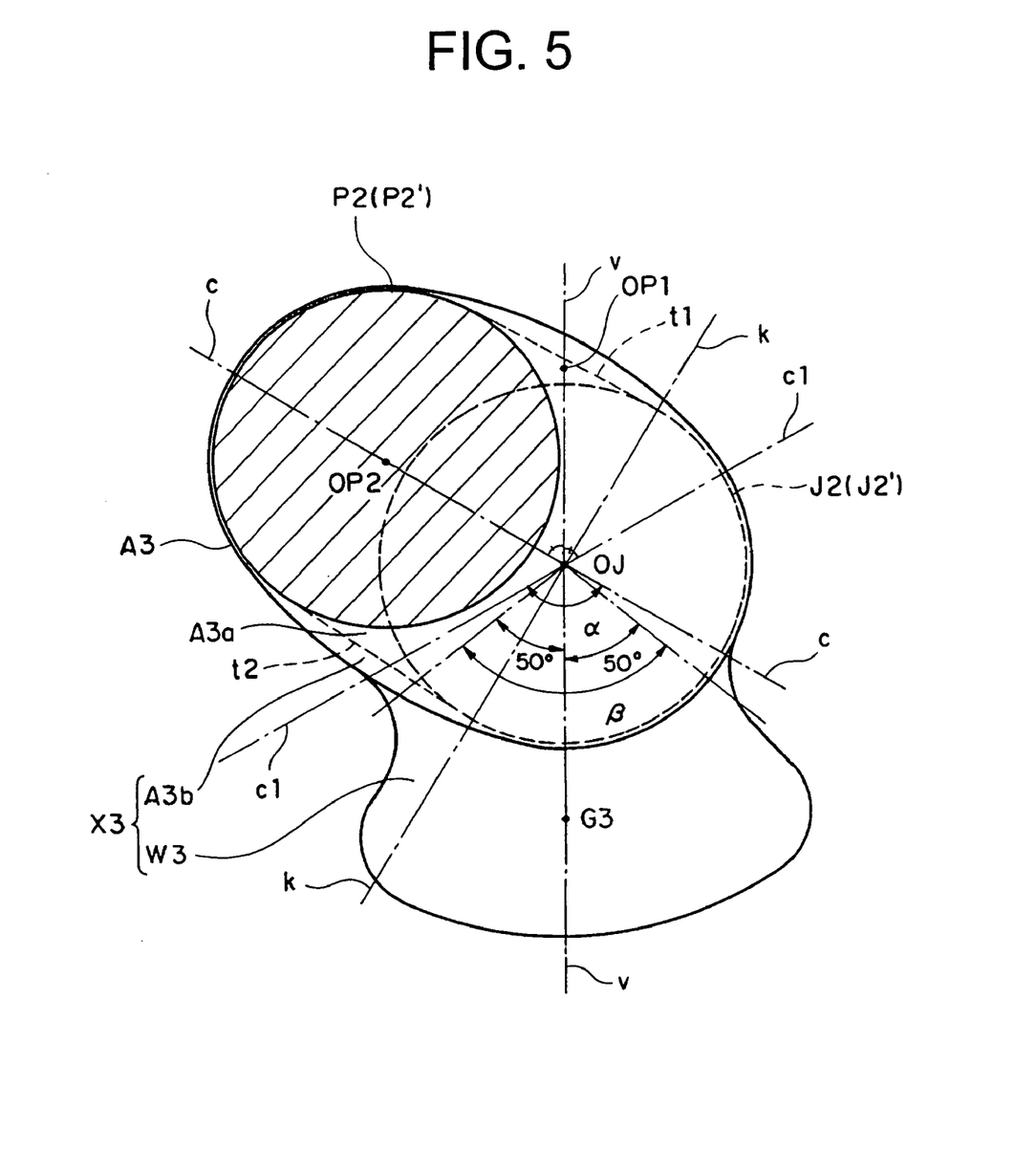
FIG. 5 is a sectional view taken along the line V-V of FIG. 1.

FIG. 5 shows the configuration of the arm A3. FIG. 5 is a sectional view taken along the line V-V of FIG. 1. The arm A3 includes a connecting portion A3a for connecting the crank pin P2 and the crank journal J2, an outer edge portion A3b surrounding the outer edge of the connecting portion A3a, and the counterweight W3 for achieving a reduction in rotational force of inertia and in unbalance couple. Of these, the region composed of a combination of the outer edge portion A3b and the counterweight W3 will be referred to as a surplus weight portion X3.

In the following, the connecting portion A3a and the surplus weight portion X3 will be defined.

FIG. 5 shows a circle P2' formed through projection of the outer periphery of the crank pin P2, and a circle J2' formed through projection of the outer periphery of the crank journal J2. The circles P2' and J2' are formed not through projection of the outer peripheries of the radiused portions R at axial ends of the crank pin P2 and the crank journal J2 but through projection of the outer peripheries of the cylindrical portions that are rotatably engaged with the connecting rod or the journal bearing.

A point obtained through projection of the central axis of the crank pin P2 (that is, the center of the circle P2') will be referred to as the point OP2, a point obtained through projection of the central axis of the crankshaft 1 (that is, the center of the circle J2') will be referred to as the point OJ, and a straight line passing the point OP2 and the point OJ will be referred to as a straight line c, which constitutes a first straight line for the third arm. Common tangents to the circle P2' and the circle J2' will be referred to as tangents t1 and t2. (When there exist three or more common tangents, only the tangents passing the points of contact of the two circles that are on the same side with respect to the straight line c will be taken into consideration.) A region defined by the circle P2', the circle J2', and the common tangents t1 and t2 is the connecting portion A3a.

In this way, the connecting portion A3a is defined, and the portion of the arm A3 other than the connecting portion A3a is defined as a surplus weight portion X3. In FIG. 5, the center of gravity of the surplus weight portion X3 is indicated by symbol G3.

A point obtained through projection of the central axis of the crank pin at the outermost end on the arm A3 side as seen from the arm A5 situated at the center of the crankshaft 1, that is, of the crank pin P1 (not shown in FIG. 5), will be referred to as the point OP1. A straight line passing the point OP1 and the point OJ will be referred to as a straight line v, which constitutes a central straight line for the third arm. Then, the center of gravity G3 is positioned in the straight line v, and is on the opposite side of the point OP1 with respect to the point OJ. That is, the center of gravity G3 is situated in a direction completely opposite to that of the crank pin P1 with respect to the central axis of the crankshaft 1.

Figure 6:
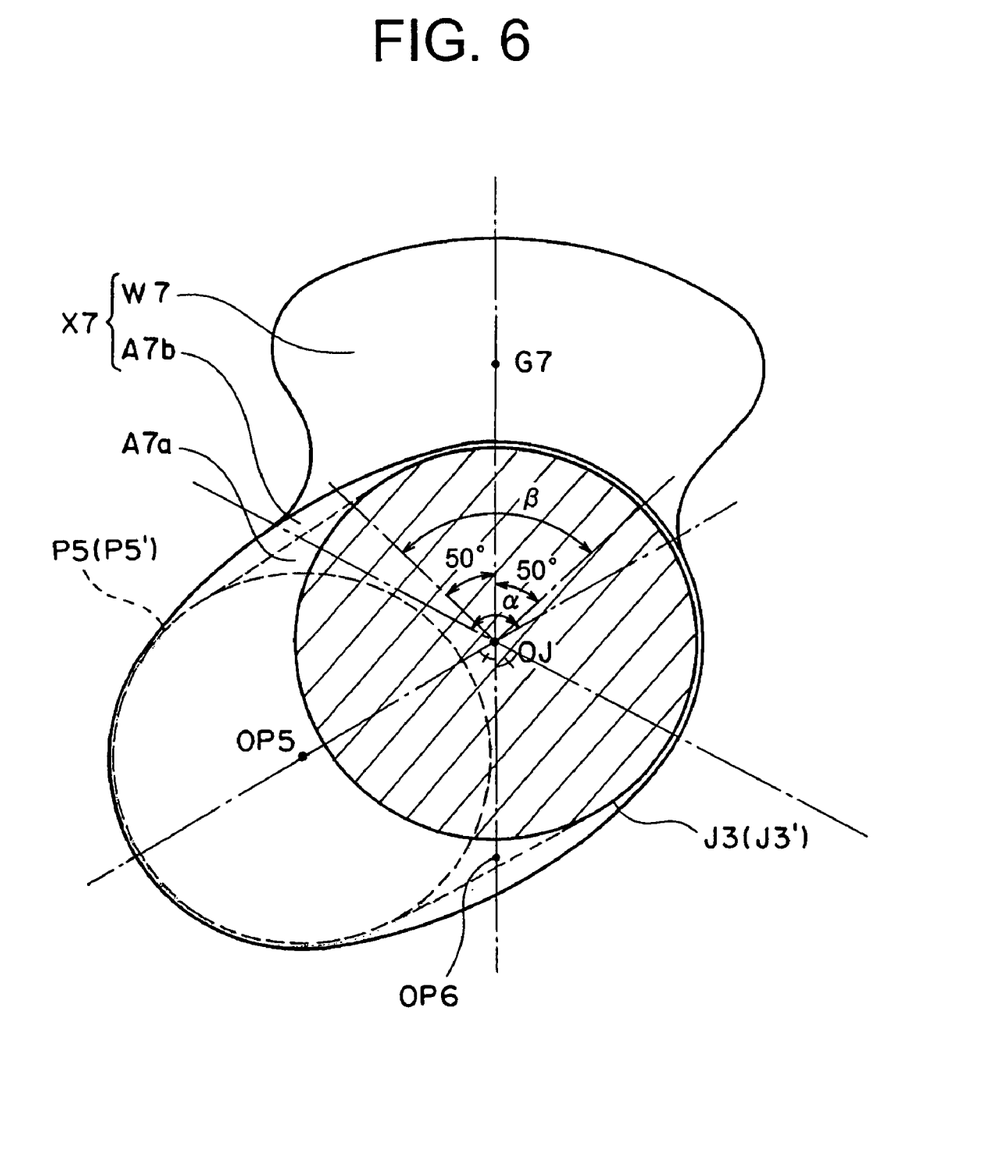
FIG. 6 is a sectional view taken along the line VI-VI of FIG. 1.

FIG. 6 shows the configuration of the arm A7. FIG. 6 is a sectional view taken along the line VI-VI of FIG. 1. Like the arm A3 described above, the arm A7 includes a connecting portion A7a and a surplus weight portion X7 composed of a combination of an outer edge portion A7b and a counterweight W7.

The surplus weight portion X7 is defined in the same manner as the surplus weight portion X3 of the arm A3. That is, the connecting portion A7a is defined in relation to a circle P5' (whose center is the point OP5) obtained through projection of the outer periphery of the crank pin P5, and a circle J3' obtained through projection of the outer periphery of the crank journal J3, and a portion obtained by removing the connecting portion A7a from the arm A7 is the surplus weight portion X7.

The center of gravity G7 of the surplus weight portion X7 is situated in the straight line passing the point OP6 obtained through projection of the central axis of the crank pin P6 (not shown in FIG. 6) and the point OJ obtained through projection of the central axis of the crankshaft 1 (that is, the center of the circle J3'), and is on the opposite side of the point OP6 with respect to the point OJ.

The configuration of the arms A1, A2, A8, and A9 may be a well-known one. For example, in this embodiment, as shown in FIGS. 1 through 3, they are formed such that the centers of gravity of the surplus weight portions including the counterweights are situated in optimum directions in helping to achieve a reduction in unbalance couple.

In the arm A1, the center of gravity of the surplus weight portion of the arm A1 (not shown; it is defined in the same manner as the arms A3 and A7) is situated in a straight line passing a point obtained through projection of the central axis of the crankshaft 1 and a point obtained through projection of the central axis of the crank pin P1, and is situated in a direction opposite the center of the crank pin P1 with respect to the point obtained through projection of the central axis of the crankshaft 1.

In the arm A2, the center of gravity of the surplus weight portion of the arm A2 (not shown; it is defined in the same manner as the arms A3 and A7) is situated in a straight line passing a point obtained through projection of the central axis of the crankshaft 1 and a point obtained through projection of the central axis of the crank pin P1, and is situated in a direction opposite the center of the crank pin P1 with respect to the point obtained through projection of the central axis of the crankshaft 1.

The arms A8 and A9 are respectively constructed in a fashion similar to the arms A2 and A1.

Figure 7:
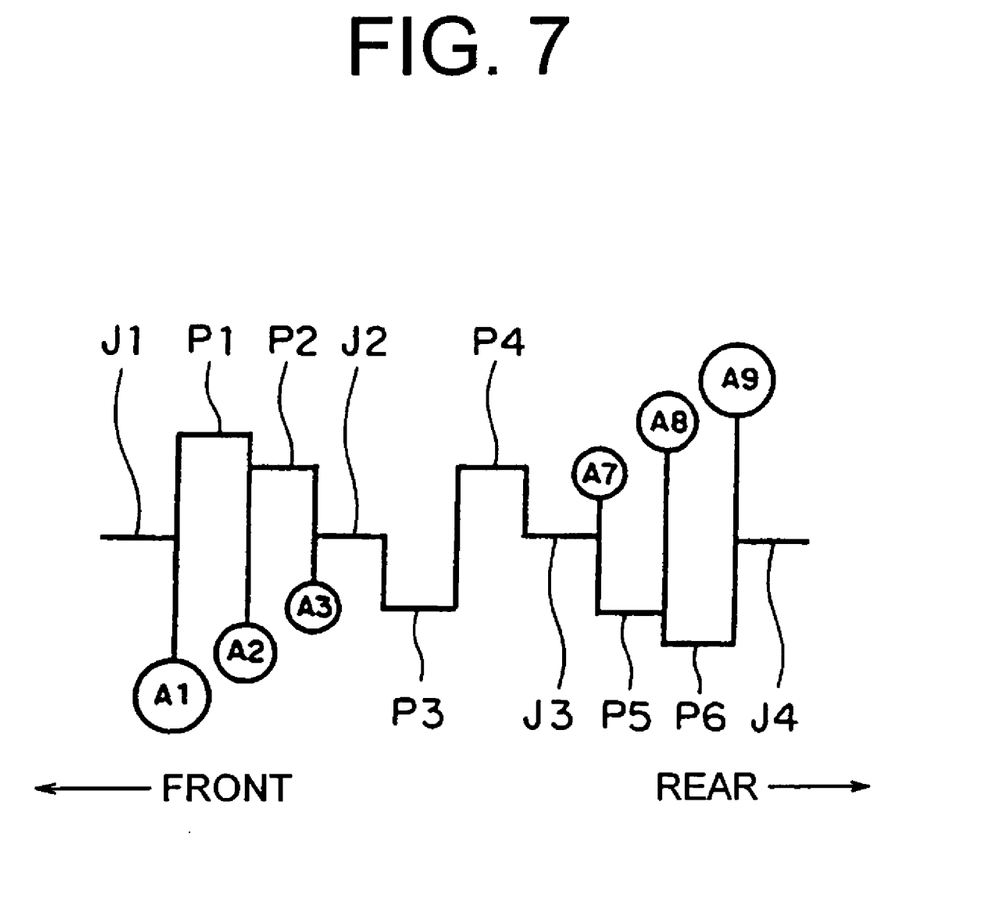
FIG. 7 is a schematic balance chart based on FIG. 1.
Figure 8:
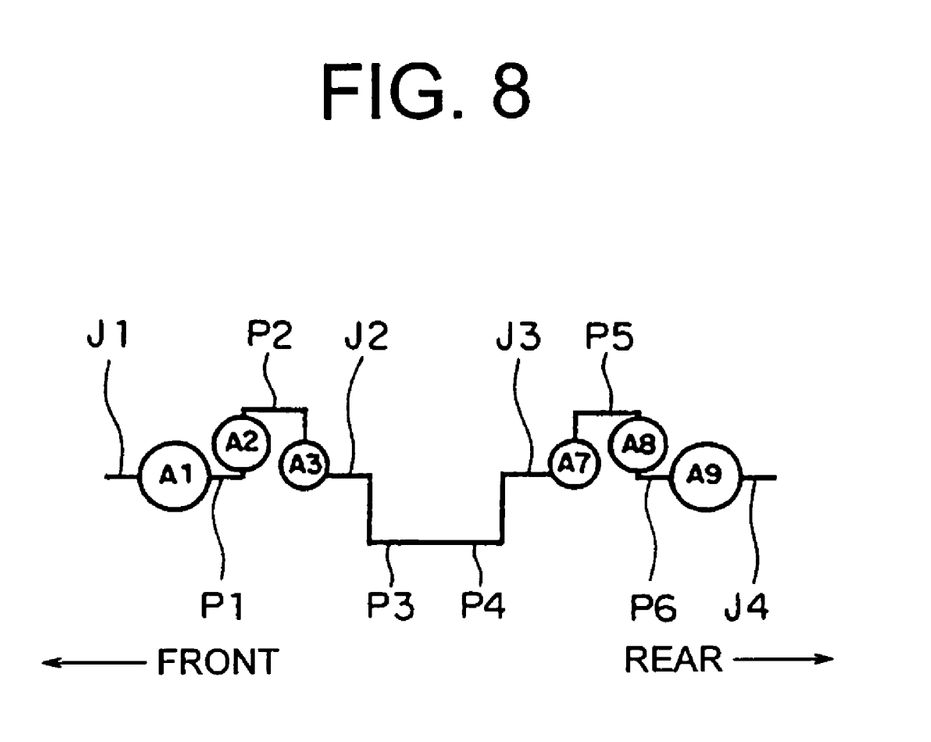
FIG. 8 is a schematic balance chart based on FIG. 2.
Figure 9:
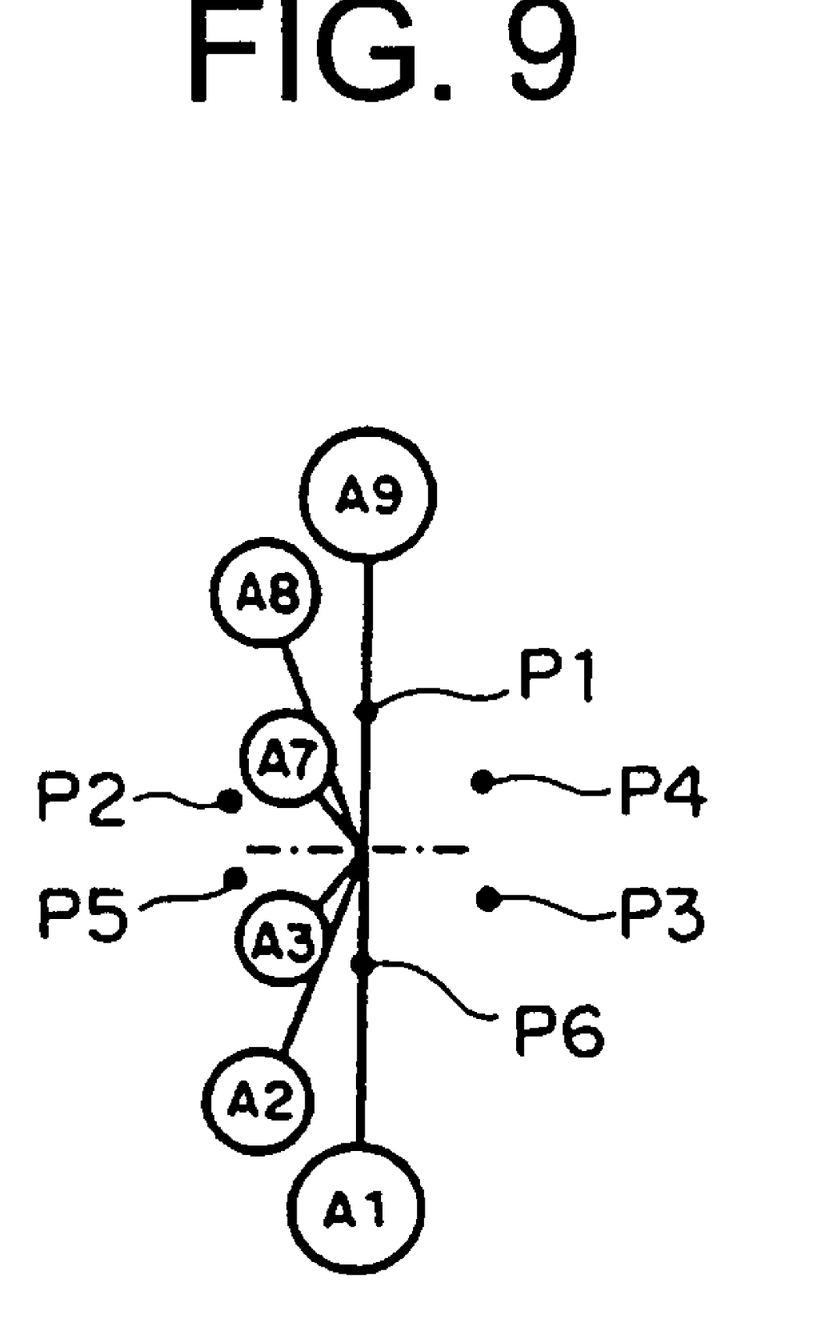
FIG. 9 is a view of the crankshaft, corresponding to the balance charts of FIGS. 7 and 8, as seen from a front side in an axial direction.

FIGS. 7 through 9 each show a balance state including the total weight and the position of the center of gravity of each arm.

FIG. 7 is a balance chart obtained through simplification of FIG. 1, showing the balance in weight of the arm as a whole (including the connecting portion and the surplus weight portion) in a form of a circle for each of the arms A1 through A3 and A7 through A9. A position corresponding to the center of each circle indicates the position of the overall center of gravity of each arm. Since the arms A4 through A6 have no counterweights, circles thereof are not represented.

FIG. 8 is a balance chart similar to FIG. 7 obtained through simplification of FIG. 2, and FIG. 9 is a diagram showing the balance charts of FIGS. 7 and 8 as seen from the front side in the axial direction.

As stated above, each circle shown in FIGS. 7 through 9 shows the balance of each arm as a whole, and does not show the balance of the counterweight exclusively or the balance of the surplus weight portion exclusively. For example, regarding the arm A3, the circle indicating the overall center of gravity thereof in FIGS. 7 through 9 indicates the overall center of gravity thereof including both the connecting portion A3a and the surplus weight portion X3 in FIG. 5, and the overall center of gravity is situated at a position different from the center of gravity G3 of the surplus weight portion X3 only.

Regarding the arms A1 through A3 and the arms A7 through A9, the weight of each of the arms as a whole satisfies the following relationship: A1=A9>A2=A8>A3=A7. Further, the distance between the central axis of the crankshaft 1 and the overall center of gravity of each of the arms as a whole also satisfies the following relationship: A1=A9>A2=A8>A3=A7.

In FIG. 9, as seen from the central axis of the crankshaft 1, the direction of the overall center of gravity of the arm A1 is completely opposite to the direction of that of the arm A9. The overall centers of gravity of the arms A2, A3, A7, and A8 are all on the same side as the centers of the crank pins P2 and P5 with respect to the straight line passing the overall centers of gravity of the arms A1 and A9. Further, the overall centers of gravity of the arms A1, A2, and A3 are on the same side as the centers of the crank pins P3, P5, and P6 with respect to the straight line (indicated by a broken line in FIG. 9) orthogonal to the straight line passing the overall centers of gravity of the arms A1 and A9 and crossing the central axis of the crankshaft 1, whereas the overall centers of gravity of the arms A7, A8, and A9 are on an opposite side thereof, that is, on the same side as the centers of the crank pins P1, P2, and P4.

Next, the operation of the crankshaft 1, the arms, and the counterweights, constructed as described above, will be illustrated.

When an engine operates, the small end portions of the connecting rods connected to the pistons reciprocate, and, with this reciprocation, the crank pins P1 through P6 connected to the big end portions of the connecting rods rotate around the central axis of the crankshaft 1. In this process, there is exerted a rotational force of inertia due to the weight of the rotating portions including the crank pins P1 through P6 and the big end portions of the connecting rods, and a bearing load is generated between the crank journals J1 through J4 and the journal bearings supporting them.

In the counterweights W1 through W3 and W7 through W9, the centers of gravity of the surplus weight portions of the corresponding arms are situated in a direction completely opposite or substantially opposite to that of the crank pins connected to the arms with respect to the central axis of the crankshaft 1, whereby the above-mentioned rotational force of inertia is reduced. As a result, the bearing load generated in the crank journals J1 through J4 is reduced.

Due to the weight of the reciprocating portions including the pistons and the small end portions of the connecting rods, and the weight of the rotating portions including the crank pins P1 through P6 and the big end portions of the connecting rods, there is generated an unbalance couple of a rotational primary component, which causes generation of a so-called precession in the crankshaft 1.

The counterweights W1 through W3 are constructed such that the centers of gravity of the surplus weight portions of the corresponding arms are situated in a direction completely opposite or substantially opposite to that of the crank pin P1 with respect to the central axis of the crankshaft 1.

Similarly, the counterweights W7 through W9 are constructed such that the centers of gravity of the surplus weight portions of the corresponding arms are situated in a direction completely opposite or substantially opposite the crank pin P6 with respect to the central axis of the crankshaft 1.

Due to this construction, it is possible to achieve a reduction in the unbalance couple generated in the crankshaft 1.

In this way, in the crankshaft 1 for a V-type six-cylinder diesel engine of Embodiment 1 of the present invention, the arm A5 has no counterweight, so that it is possible to achieve a reduction in weight. Further, the arms A1 through A3 and the arms A7 through A9 have the counterweights W1 through W3 and the counterweights W7 through W9, respectively, so that it is possible to achieve a reduction in unbalance couple. That is, it is possible to achieve compatibility between a reduction in weight and a reduction in unbalance couple.

In the crankshaft 1, the arm A5 has no counterweight, so that the effect of reducing the bearing load generated in the crank journals J2 and J3 through the rotational force of inertia of the crank pins P3 and P4 is lower than that in a case of a crankshaft in which the arm A5 has a counterweight.

However, the crankshaft 1 of Embodiment 1 of the present invention is for use in a diesel engine, which is not run at such high speeds as a gasoline engine. Thus, the effect of reducing the bearing load generated in the crank journals J2 and J3 is low. Accordingly, in the crankshaft 1, which is for use in a diesel engine, there is involved practically no disadvantage of increasing the bearing load due to the fact that the arm A5 has no counterweight, making it possible to attain, substantially exclusively, compatibility between a reduction in weight and a reduction in unbalance couple.

Further, the arms A1 through A3 and the arms A7 through A9 respectively having counterweights are concentrated on both ends of the crankshaft 1, so that if the total weight is the same as that of a construction in which counterweights are provided on arms near the center (e.g., a construction in which each of the arms A1, A2, A4, A6, A8, and A9 has a counterweight), a moment generated is larger, whereby it is possible to more efficiently achieve a reduction in unbalance couple.

In particular, the center of gravity G3 of the surplus weight portion X3 of the arm A3 is situated in a direction completely opposite to that of the crank pin P1 with respect to the central axis of the crankshaft 1. Similarly, the center of gravity G7 of the surplus weight portion X7 of the arm A7 is situated in a direction completely opposite to that of the crank pin P6, so that it is possible to efficiently reduce the unbalance couple generated by the crank pins P1 and P6.

Further, in a conventional crankshaft, counterweights of the arms corresponding to the arms A4 and A6 are provided so as to be in a direction substantially opposite the crank pins connected (respectively corresponding to P3 and P4 in FIG. 4). As shown in FIG. 4, these tend to increase the unbalance couple in the crankshaft generated by the outermost end crank pins (corresponding to P1 and P6 of FIG. 4).

In contrast, in the crankshaft 1 of Embodiment 1 of the present invention, the arms A4 and A6 have no counterweights, so that they do not increase the unbalance couple in the crankshaft 1. That is, it is possible to further reduce the uncouple balance as compared with the case of the conventional crankshaft.

While in Embodiment 1 of the present invention described above the bank angle of the engine is 60°, this should not be construed restrictively. The bank angle maybe an angle around 60°, for example, 45° or 72°. Further, the bank angle may also be a different angle as long as it is larger than 0° but smaller than 90°. That is, it may be an angle of somewhere between the bank angle of the straight V-type and that of the 90° V-type.

While in Embodiment 1 of the present invention, the center of gravity G3 of the surplus weight portion X3 of the arm A3 is situated in a direction completely opposite to that of the point OP1 with respect to the central axis of the crankshaft 1, that is, in the straight line v, it is not always necessary for the center of gravity to be in the straight line v. It is only necessary for the center of gravity to be in a direction within a predetermined range.

This predetermined range will be described with reference to FIG. 5. A straight line symmetrical with the straight line c with respect to the straight line v will be referred to as a straight line c1, which is a second straight line for the third arm. The center of gravity G3 is on the opposite side of the point OP1 obtained through projection of the central axis of the crank pin P1 with respect to the straight line c and also with respect to the straight line c1. That is, in FIG. 5, the center of gravity G3 is within the range indicated by an angle α. As compared with a construction in which the center of gravity G3 is in the straight line c or c1, in the construction in which the center of gravity G3 is in this range, the center of gravity G3 is closer to the direction completely opposite to that of the point OP1 with respect to the point OJ, so that it is possible to reduce the unbalance couple in the crankshaft 1 more efficiently.

This predetermined range may be a range of 50° on either side of the straight line v, that is, assuming that the angle is 0° when the center of gravity is in a direction completely opposite to that of the point OP1 with respect to the point OJ, the predetermined range may be a range of 50° on either side thereof. This range is indicated by a symbol β in FIG. 5.

Figure 10:
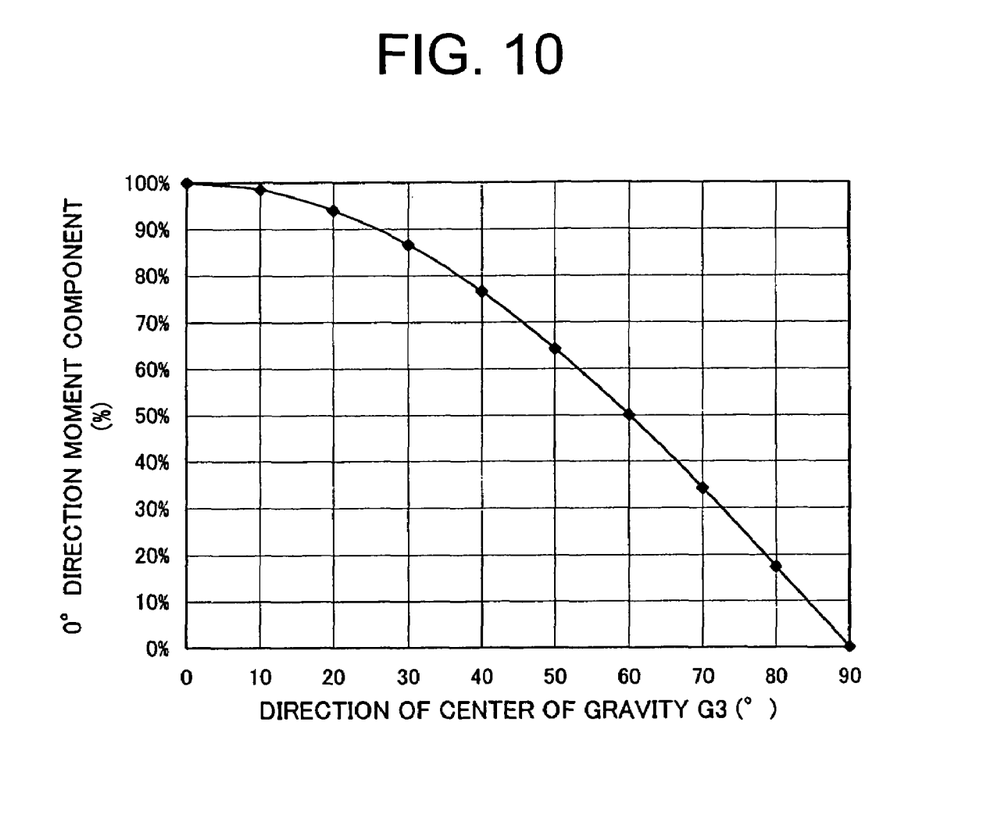
FIG. 10 is a graph showing a relationship between a direction in which the center of gravity G3 is situated and a moment component in a 0° direction.

In the graph of FIG. 10, the X-axis indicates the direction of the center of gravity G3, and the Y-axis indicates the ratio in percent of the 0° direction component of a moment generated by the surplus weight portion X3. According to this graph, the reduction in the moment component is non-linear and relatively gentle until the direction of the center of gravity G3 reaches 50°, whereas, when 50° is exceeded, the moment component reduces abruptly in a substantially linear fashion. The 0° direction moment component reduces the unbalance couple in the crankshaft 1, so that the larger this moment component is, the more efficient the reduction of the unbalance couple can be.

Thus, from the graph of FIG. 10, assuming that the direction completely opposite to that of the point OP1 with respect to the point OJ is 0°, it is possible to more efficiently reduce the unbalance couple in the crankshaft 1 when the center of gravity G3 is situated in a direction in the range of 50° on either side thereof.

While the above description regarding the predetermined range is applicable to the arm A3, it is also applicable to the arm A7. Here, the arm A3 corresponds to the arm A7, the surplus weight portion X3 corresponds to the surplus weight portion X7, the center of gravity G3 corresponds to the center of gravity G7, the point OP1 corresponds to the point OP6, and the point OP2 corresponds to the point OP5. Based on this correspondence relationship, it is possible to define a central straight line for the seventh arm, a first straight line for the seventh arm, and a second straight line for the seventh arm, which respectively correspond to the central straight line for the third arm, the first straight line for the third arm, and the second straight line for the third arm.

Embodiment 2

A crankshaft (FIG. 11) according to Embodiment 2 of the present invention is realized by modifying the crankshaft 1 according to Embodiment 1 of the present invention such that the arm A5 has a counterweight W5.

Figure 11:
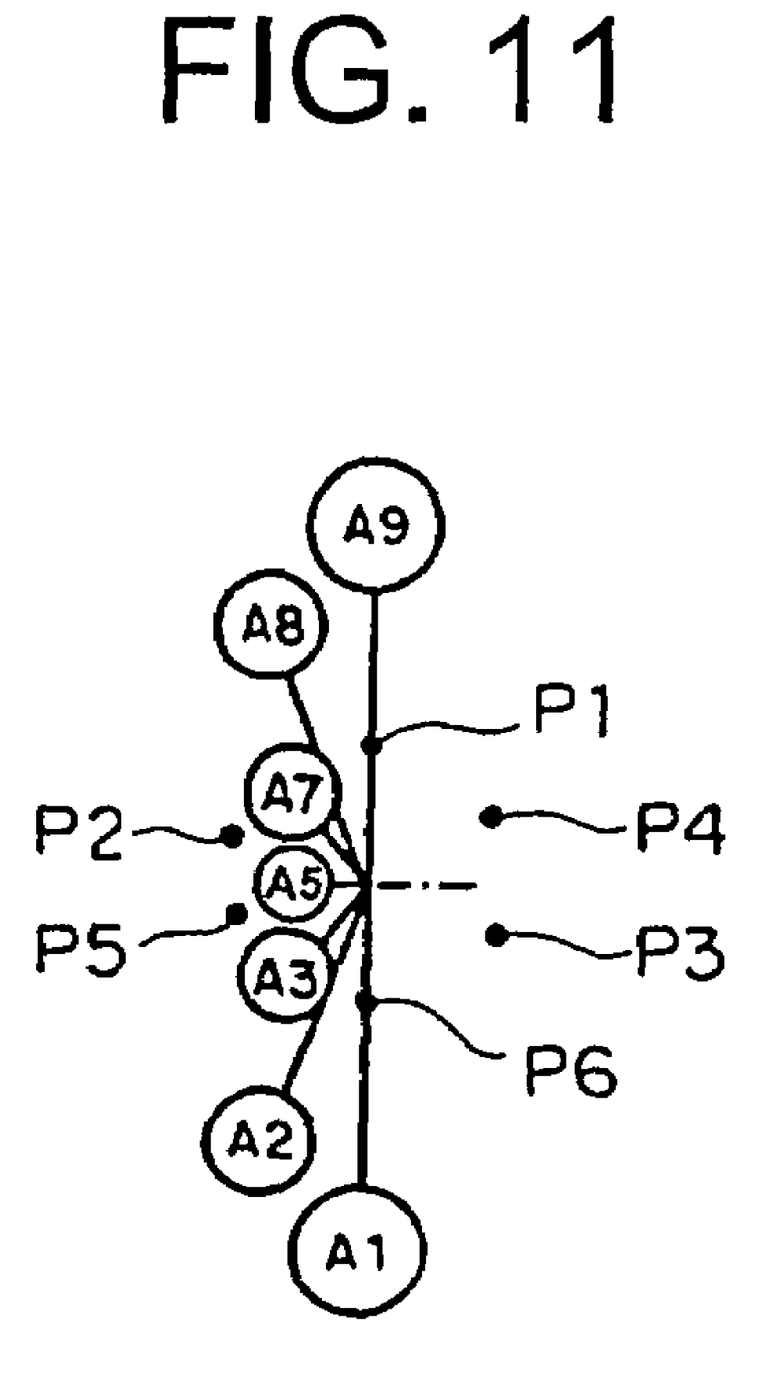
FIG. 11 is a view of the crankshaft, corresponding to the balance charts of FIG. 9 and according to Embodiment 2 of the present invention.

As described below, the counterweight W5 is arranged in a direction opposite the crank pins P3 and P4 with respect to the central axis of the crankshaft 1.

The arm A5 includes the following portions that are to be defined in the same manner as those of the arms A3 and A7: a connecting portion A5a for connecting the crank pins P3 and P4, an outer edge portion A5b surrounding the outer edge of the connecting portion A5a, and the counterweight W5 for achieving a reduction in rotational force of inertia. Of these, as in the arms A3 and A7, the region composed of a combination of the outer edge portion A5b and the counterweight W5 will be referred to as a surplus weight portion X5. The center of gravity of the surplus weight portion X5 will be referred to as the center of gravity G5.

In the axial section of the crankshaft 1, the point obtained through projection of the center of gravity G5 is situated in a direction completely opposite the midpoint of the two points obtained through projection of the respective central axes of the crank pins P3 and P4 with respect to the central axis of the crankshaft 1. That is, the point obtained through projection of the center of gravity G5 is situated in a direction substantially opposite both of the points obtained through projection of the crank pins P3 and P4 to which the arm A5 is connected.

In this way, in the crankshaft 2 according to Embodiment 2 of the present invention, the arm A5 has the counterweight W5, so it is possible to reduce the rotational force of inertia generated by the crank pins P3 and P4, whereby it is possible to reduce the bearing load generated in the crank journals J2 and J3.

What is claimed is:

1. A crankshaft for a V-type six-cylinder engine, comprising:

first through fourth crank journals arranged in the stated order from a front end to a rear end, the crankshaft being supportable by an external support member by means of the first through fourth crank journals, the first through fourth crank journals being arranged coaxially, and central axes of the first through fourth crank journals constituting a central axis of the crankshaft;

first through sixth crank pins which may be respectively connected to external connecting rods, the first crank pin and the second crank pin being arranged between the first crank journal and the second crank journal, the third crank pin and the fourth crank pin being arranged between the second crank journal and the third crank journal, and the fifth crank pin and the sixth crank pin being arranged between the third crank journal and the fourth crank journal, in the stated order from the front to the rear end; and first through ninth arms connecting the first through fourth crank journals and the first through sixth crank pins to each other, the first through ninth arms being provided in the stated order from the front to the rear end between the first through fourth crank journals and the first through sixth crank pins, wherein the first, second, eighth, and ninth arms each have a counterweight, the fourth and sixth arms have no counterweights, wherein the third arm has a counterweight, and where, as seen in the axial direction of the crankshaft, assuming that a straight line passing a point obtained through projection of the central axis of the first crank pin and a point obtained through projection of the central axis of the crankshaft is a central straight line for the third arm, that a straight line passing a point obtained through projection of the central axis of the second crank pin and a point obtained through projection of the central axis of the crankshaft is a first straight line for the third arm, and that a straight line symmetrical with the first straight line for the third arm with respect to the central straight line for the third arm is a second straight line for the third arm, a point obtained through projection of the center of gravity of a surplus weight portion including the counterweight of the third arm is situated on the opposite side of the point obtained through projection of the central axis of the first crank pin with respect to the first straight line for the third arm, and is situated on the opposite side of the point obtained through projection of the central axis of the first crank pin with respect to the second straight line for the third arm, wherein the seventh arm has a counterweight, and where, as seen in the axial direction of the crankshaft, assuming that a straight line passing a point obtained through projection of the central axis of the sixth crank pin and a point obtained through projection of the central axis of the crankshaft is a central straight line for the seventh arm, that a straight line passing a point obtained through projection of the central axis of the fifth crank pin and a point obtained through projection of the central axis of the crankshaft is a first straight line for the seventh arm, and that a straight line symmetrical with the first straight line for the seventh arm with respect to the central straight line for the seventh arm is a second straight line for the seventh arm, a point obtained through projection of the center of gravity of a surplus weight portion including the counterweight of the seventh arm is situated on the opposite side of the point obtained through projection of the central axis of the sixth crank pin with respect to the first straight line for the seventh arm, and is situated on the opposite side of the point obtained through projection of the central axis of the sixth crank pin with respect to the second straight line for the seventh arm.

2. A crankshaft according to claim 1, wherein the fifth arm has a counterweight for achieving a reduction in rotational force of inertia.

3. A crankshaft according to claim 1, wherein, as seen in the axial direction of the crankshaft, the point obtained through projection of the center of gravity of the surplus weight portion including the counterweight of the third arm is in the central straight line for the third arm, and the point obtained through projection of the center of gravity of the surplus weight portion including the counterweight of the seventh arm is in the central straight line for the seventh arm.

4. A crankshaft according to claim 1, wherein, as seen in the axial direction of the crankshaft, the point obtained through projection of the center of gravity of the surplus weight portion including the counterweight of the third arm is situated within a range of 50° on both sides of a direction completely opposite to a direction of the point obtained through projection of the central axis of the first crank pin with respect to the point obtained through projection of the central axis of the crankshaft, and the point obtained through projection of the center of gravity of the surplus weight portion including the counterweight of the seventh arm is situated within a range of 50° on both sides of a direction completely opposite to a direction of the point obtained through projection of the central axis of the sixth crank pin with respect to the point obtained through projection of the central axis of the crankshaft.

* * * * *

UNITED STATES PATENT AND TRADEMARK OFFICE
CERTIFICATE OF CORRECTION

PATENT NO. : 7,234,432 B2  
APPLICATION NO. : 11/497212  
DATED : June 26, 2007  
INVENTOR(S) : Tetsushi Nagira Page 1 of 1

It is certified that error appears in the above-identified patent and that said Letters Patent is hereby corrected as shown below:

Column 7, line 66, please delete "uncouple balance" and insert therefore --unbalance couple--; and Column 9, line 31, please delete "opposite both" and insert therefore --opposite to both--.

Signed and Sealed this

Eighteenth Day of August, 2009

David J. Kappos
*Director of the United States Patent and Trademark Office*